United States Patent
Kim et al.

(10) Patent No.: US 10,372,829 B2
(45) Date of Patent: Aug. 6, 2019

(54) METHOD AND COMPUTER READABLE RECORDING MEDIUM FOR PROVIDING TRANSLATION USING IMAGE

(71) Applicant: NAVER CORPORATION, Seongnam-si (KR)

(72) Inventors: Jun Seok Kim, Seongnam-si (KR); Hyoung Gyu Lee, Seongnam-si (KR); Joong Hwi Shin, Seongnam-si (KR); Jae Song Lee, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 203 days.

(21) Appl. No.: 15/212,541

(22) Filed: Jul. 18, 2016

(65) Prior Publication Data
US 2017/0286406 A1 Oct. 5, 2017

(30) Foreign Application Priority Data

Mar. 29, 2016 (KR) ........................ 10-2016-0037416

(51) Int. Cl.
*G06F 17/00* (2019.01)
*G06F 17/28* (2006.01)
(Continued)

(52) U.S. Cl.
CPC ........ *G06F 17/289* (2013.01); *G06F 3/04842* (2013.01); *G06F 16/51* (2019.01); *G06F 16/54* (2019.01); *G06F 17/2809* (2013.01)

(58) Field of Classification Search
CPC ... G10L 15/22; G10L 2015/223; G10L 15/30; G10L 15/005; G10L 13/00; G10L 13/027;
(Continued)

(56) References Cited

U.S. PATENT DOCUMENTS

| | | | |
|---|---|---|---|
| 7,689,407 B2 * | 3/2010 | Yang | G09B 5/06 345/171 |
| 7,778,632 B2 * | 8/2010 | Kurlander | H04M 1/72566 348/61 |

(Continued)

FOREIGN PATENT DOCUMENTS

| | | |
|---|---|---|
| JP | 2003-006190 | 1/2003 |
| JP | 2011-159077 | 8/2011 |

(Continued)

OTHER PUBLICATIONS

Japanese office action issued in corresponding Japanese patent application No. 2016-147029, dated Sep. 12, 2017.

(Continued)

*Primary Examiner* — Edgar X Guerra-Erazo
(74) *Attorney, Agent, or Firm* — Greer Burns & Crain, Ltd.

(57) ABSTRACT

A method for providing an original sentence and a translation for the original sentence in a user terminal, includes: presenting, by the user terminal, a plurality of images to a user; verifying, by the user terminal, an image selected by the user among the plurality of images; obtaining, by the user terminal, an original sentence corresponding to the image selected by the user and a translation sentence for the image from a database; and providing, by the user terminal, the original sentence corresponding to the selected image and the translation for the original sentence together with the selected image.

11 Claims, 14 Drawing Sheets

(51) Int. Cl.
*G06F 16/51* (2019.01)
*G06F 3/0484* (2013.01)
*G06F 16/54* (2019.01)

(58) Field of Classification Search
CPC . G10L 13/043; G06F 17/289; G06F 17/2854; G06F 17/2836; G06F 17/28; G06F 3/04842
See application file for complete search history.

(56) References Cited

U.S. PATENT DOCUMENTS

| | | | | |
|---|---|---|---|---|
| 7,783,472 | B2* | 8/2010 | Nagao | G06F 17/289 704/2 |
| 8,635,058 | B2* | 1/2014 | Patel | G06Q 30/04 704/10 |
| 9,165,406 | B1* | 10/2015 | Gray | G06K 9/00456 |
| 2001/0032070 | A1* | 10/2001 | Teicher | G06F 17/28 704/2 |
| 2003/0085933 | A1* | 5/2003 | Ortega | G09F 3/02 715/865 |
| 2003/0163300 | A1* | 8/2003 | Kasvand | G06F 17/275 704/2 |
| 2006/0206305 | A1* | 9/2006 | Kimura | G06F 17/2827 704/2 |
| 2007/0099602 | A1* | 5/2007 | Kurlander | H04M 1/72566 455/418 |
| 2008/0233980 | A1* | 9/2008 | Englund | G06F 17/289 455/466 |
| 2009/0094016 | A1* | 4/2009 | Mao | G06F 17/28 704/3 |
| 2011/0191611 | A1 | 8/2011 | boni ang gaw go et al. | |
| 2012/0182288 | A1 | 7/2012 | Williams et al. | |
| 2013/0182899 | A1* | 7/2013 | Naito | G06K 9/6201 382/103 |
| 2015/0186360 | A1* | 7/2015 | Hazan | G09B 5/02 704/8 |
| 2016/0005189 | A1* | 1/2016 | Gray | G06K 9/00456 345/633 |

FOREIGN PATENT DOCUMENTS

| | | |
|---|---|---|
| JP | 2012-243060 | 12/2012 |
| KR | 102001-0106555 A | 12/2001 |
| KR | 10-2011-0112192 | 10/2011 |
| KR | 10-2012-0083849 A | 7/2012 |

OTHER PUBLICATIONS

Office action issued in corresponding Korean Patent App. No. 10-2016-0037416, dated Jan. 19, 2017.

* cited by examiner

FIG. 6

| | | |
|---|---|---|
| 미안합니다<br>I am sorry<br>ごめんなさい<br>对不起 | 버스 정류장이 어디입니까?<br>Where is the bus stop?<br>バス停がどこですか?<br>哪里是公共汽车站? | 사진촬영 금지입니까?<br>Photographing is prohibited?<br>写真撮影禁止ですか?<br>照相是被禁止? |

610

620
630
640
650

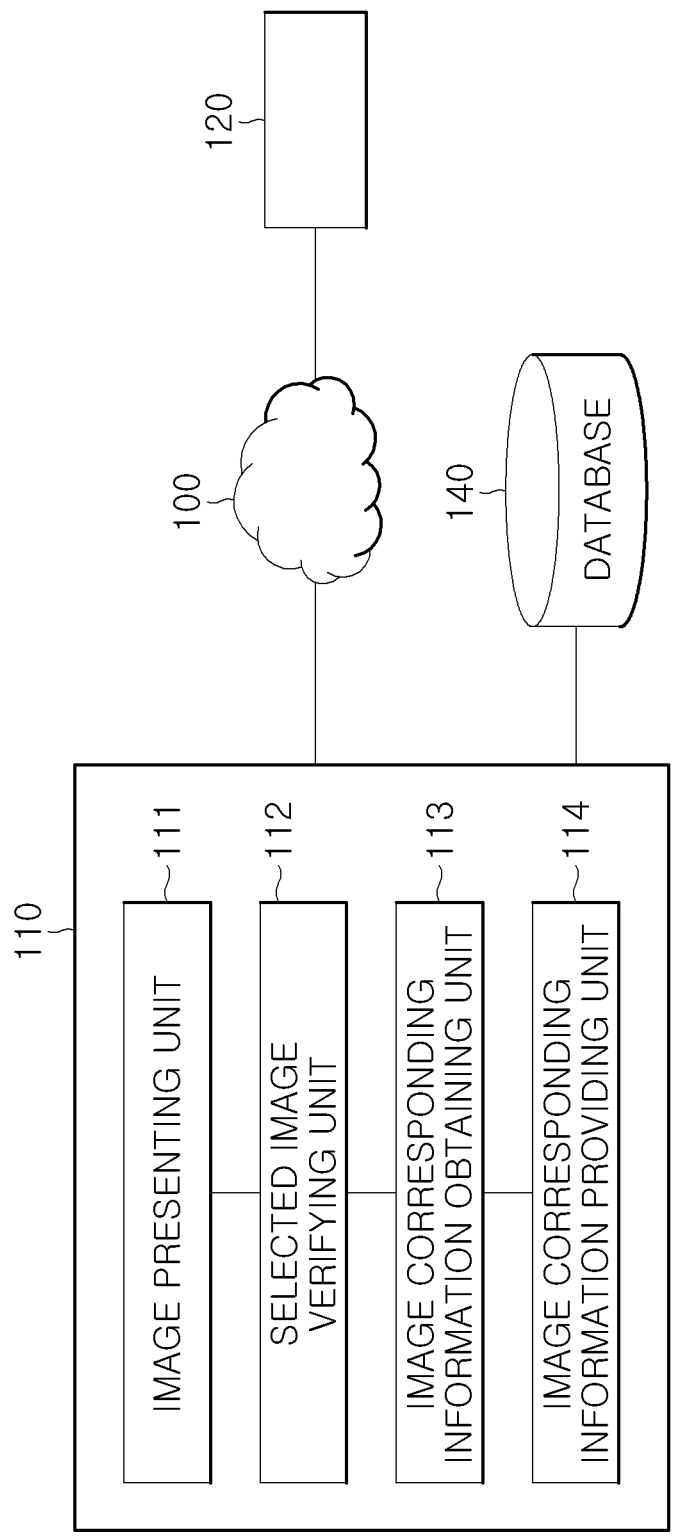

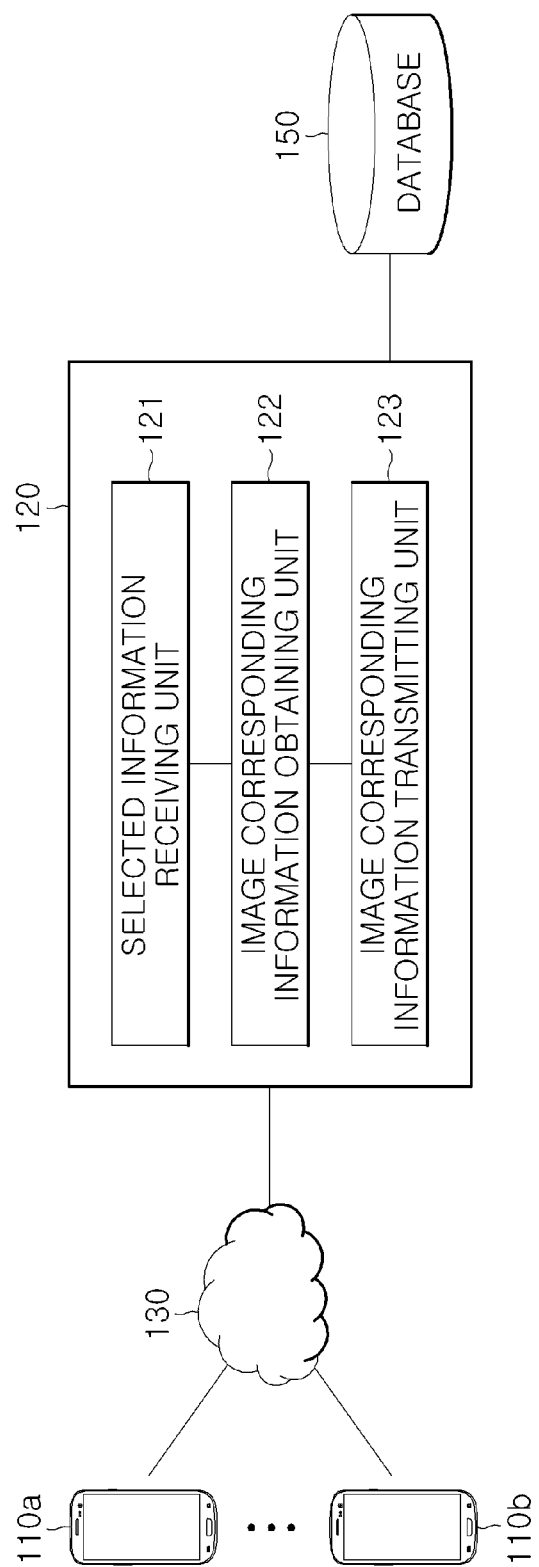

METHOD AND COMPUTER READABLE RECORDING MEDIUM FOR PROVIDING TRANSLATION USING IMAGE

CROSS-REFERENCE TO RELATED APPLICATIONS

This application claims priority to and the benefit of Korean Patent Application No. 10-2016-0037416 filed in the Korean Intellectual Property Office on Mar. 29, 2016, the entire contents of which are incorporated herein by reference.

TECHNICAL FIELD

The present invention relates to a method and a computer readable recording medium for providing a translation to a user, and more particularly, to a method and a computer readable recording medium for providing a translation, which present a plurality of images corresponding to a plurality of specific sentences to the user and thereafter, provide, when the user selects one among the plurality of images, an original and a translation for the selected image together with the selected image to allow the user to more conveniently search and receive a translation required therefor.

BACKGROUND ART

In recent years, as cases in which communication with foreigners is performed in order to visit foreign countries or perform business due to an overseas trip, a business trip have significantly increased, users who use an application or a program for interpretation and translation, which is driven in a terminal such as a smart phone or a PC have continuously increased. As a result, various attempts for implementing a more efficient interpretation/translation algorithm, such as implementation of a translation algorithm through machine learning, and the like, have been made. For example, Korean Patent Unexamined Publication No. 10-2011-0112192 discloses a machine translation system and a method thereof based on syntax analysis and a hierarchical phrase model.

However, an interpretation/translation algorithm which can be implemented in a current technical level has not yet reached up to a level to naturally interpret/translate one language into another language in practice. As a result, it is common for a translation to be awkwardly translated.

Work required for directly configuring phrases or sentences in the original language for a translation which the user intends to express and inputting the original language through a user terminal, may require a considerable amount of time, thereby causing the user and a counterpart to be inconvenienced.

Accordingly, it may be more preferable for the user to select and use an appropriate sentence (for example, "버스 정류장이 어디 입니까?") which may be used in predetermined specific situations and obtain a translation (for example, "where is the bus stop?") of the original sentence than to use the awkwardly translated sentence.

However, it may be very uncomfortable for the user to receive suggestion of multiple typical sentences (for example, hundreds to thousands of sentences) which may be used in the predetermined specific situations and select a sentence appropriate thereto among the suggested typical sentences.

In terms of the user who intends to translate a phrase or a sentence in the original language and the counterpart who receives the translated phrase or sentence, the recognition speed or the degree of understanding of the counterpart in a case in which only the translated sentence is presented may be lower than that in a case in which the appropriate image is presented together with the translated sentence.

SUMMARY OF THE INVENTION

The present invention has been made in an effort to provide a method and a computer readable recording medium for providing a translation, which can provide an original for typical sentences which may be used in predetermined specific situations and a translation acquired by accurately translating the original to a user and allow the user to more easily search and select the original and the translation.

The present invention has also been made in an effort to provide a method and a computer readable recording medium for providing a translation, which allow a user who intends to translate an original and a counterpart who receives a suggestion of a translated sentence to more efficiently recognize the original and the translation and have a higher degree of understanding.

An exemplary embodiment of the present invention provides a method for providing a translation, in which a user terminal provides an original sentence and a translation for the original sentence, including: presenting, by the user terminal, a plurality of images to a user; verifying, by the user terminal, an image selected by the user among the plurality of images; obtaining, by the user terminal, an original sentence corresponding to the image selected by the user and a translation sentence for the image from a database; and providing, by the user terminal, the original sentence corresponding to the selected image and the translation for the original sentence together with the selected image.

Another exemplary embodiment of the present invention provides a method for providing a translation in which a server provides an original sentence and a translation for the original sentence, including: receiving, by the server, information on an image selected by a user among a plurality of images presented in the user terminal from the user terminal; obtaining, by the server, an original sentence corresponding to the image selected by the user and a translation sentence for the image from a database; and transmitting, by the server, information on the original sentence corresponding to the image selected by the user and the translation for the original sentence to the user terminal.

Yet another exemplary embodiment of the present invention provides a computer readable recording medium having a program for executing, by a computer, the respective steps of the disclosed method for providing a translation, which is stored therein.

According to exemplary embodiments of the present invention, when a plurality of icons for predetermined specific situations are provided to a user and the user thus selects one of the plurality of icons, the icon and an original sentence and a translation sentence for the icon are simultaneously provided to allow the user to more easily search and select an original sentence required therefor and a translation for the original sentence.

According to the exemplary embodiments of the present invention, the original sentence and the translation sentence and images appropriate therefor are together provided to the user and a counterpart to allow the user and the counterpart to more efficiently recognize the original sentence and the translation sentence and have a higher degree of understanding.

BRIEF DESCRIPTION OF THE DRAWINGS

In order to help understand the present invention, the accompanying drawings which are included as a part of the Detailed Description provide exemplary embodiments of the present invention and describe the technical spirit of the present invention together with the Detailed Description.

FIG. 6 is an explanatory diagram for describing a configuration of a database according to an exemplary embodiment of the present invention.

FIG. 13 is a configuration diagram of a user terminal for providing a translation according to an exemplary embodiment of the present invention.

FIG. 14 is a configuration diagram of a server for providing a translation according to an exemplary embodiment of the present invention.

DETAILED DESCRIPTION

The present invention may be variously modified and have various exemplary embodiments, so that specific exemplary embodiments will be hereinafter illustrated in detail based on the accompanying drawings.

In the present invention, a detailed explanation of known related technologies may be omitted to avoid unnecessarily obscuring the gist of the present invention.

Terms, such as first, second, and the like may be used to describe various components, but the components are not restricted by the terms and the terms are only used for distinguishing one component from other components.

Hereinafter, exemplary embodiments of a method and a computer readable recording medium for providing a translation according to the present invention will be described in detail with reference to the accompanying drawings.

Figure 1:
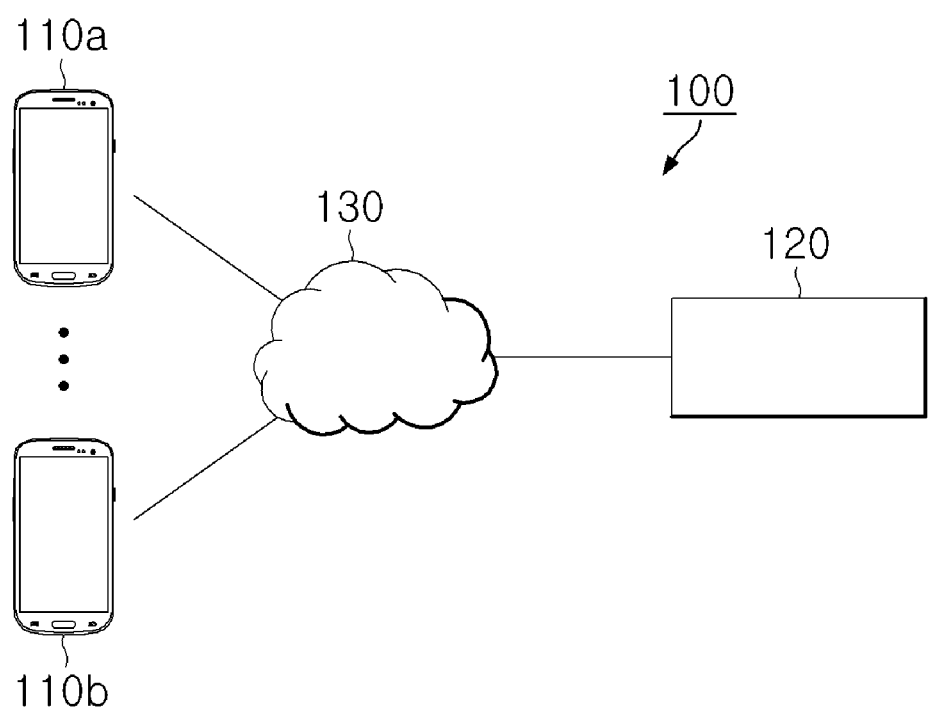
FIG. 1 is a configuration diagram of a system for providing a translation according to an exemplary embodiment of the present invention.

First, FIG. 1 illustrates a configuration diagram of a system 100 for providing a translation according to an exemplary embodiment of the present invention. As illustrated in FIG. 1, the system 100 for providing a translation according to the exemplary embodiment of the present invention is configured to include user terminals 110a to 110b (which may be referred collectively or individually as "user terminal 110") presenting a plurality of images to a user and thereafter, providing, when the user selects one of the plurality of images, the selected image and a sentence in an original language and a translation of the sentence in another language simultaneously to the user, a server 120 used to calculate the original and the translation for the selected image, and a network 130 connecting the user terminal 110 and the server 120. It should be understood that while the term "sentence" is used herein to describe the present invention, the "sentence" can include a single word or a phrase.

In this case, as the user terminal 110, various portable terminals including a smart phone, a tablet PC, a PDA, a cellular phone, and the like may be used. A plurality of images are presented to the user on a personal computer (PC), a notebook PC, and the like, and when the user selects one of the plurality of images, various terminals may be adapted to provide the selected image and the original sentence and the translation therefor simultaneously.

However, in the present invention, the user terminal 110 need not particularly obtain the original sentence and the translation of the original sentence for the image selected by the user by receiving help of the server 120, and the user terminal 110 may independently obtain the original sentence and its translation for the image selected by the user.

In the present invention, the image is not limited to a picture, a photograph, and the like and may include an icon or a video which moves, and furthermore, the image may be implemented to include characters or symbols, figures, and the like.

The network 130 connecting the user terminal 110 and the server 120 may include a wired network and a wireless network, and in detail, the network 130 may include various communication networks including a local area network (LAN), a metropolitan area network (MAN), a wide area network (WAN), and the like. The network 130 may also include known World Wide Web (WWW). However, the communication network 130 according to the present invention is not limited to the enumerated networks and may include known wireless data networks, known telephone networks, and known wired/wireless television networks.

Figure 2:
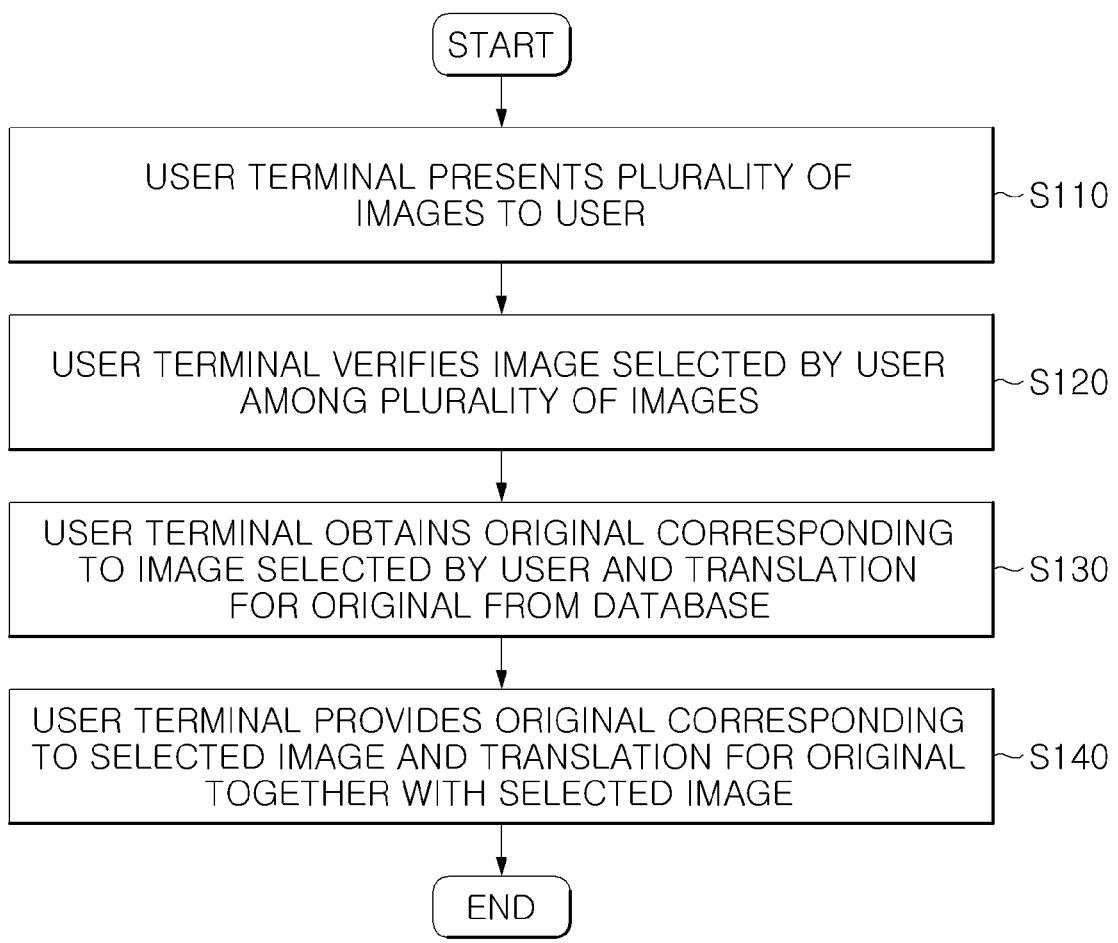
FIG. 2 is a flowchart of a method for providing a translation by a user terminal according to an exemplary embodiment of the present invention.

FIG. 2 illustrates a flowchart of a method for providing a translation by a user terminal 120 according to an exemplary embodiment of the present invention.

First, in step S110, the user terminal 110 presents a plurality of images to the user.

Herein, the plurality of images may correspond to sentences of a plurality of languages including a first language and a second language corresponding thereto, respectively. For example, when the first language is Korean and the second language is English, a sentence of the first language of a user who uses Korean, that is, a Korean sentence may become the original sentence and a sentence of the second language, which corresponds thereto, that is, an English sentence may be used as the translation of the original sentence, i.e., a translation sentence. Of course, the English sentence of the second language may be the original sentence and the Korean sentence of the first language may be the translation sentence, of course.

The present invention may be implemented as an independent application (App) or program, but may also be configured to be integrated into an existing application or program that translates the original sentence input by the user into the translation sentence and provides the translation.

In this case, an icon or a menu is selected on a screen in which the application or program is driven, which translates the original sentence input by the user into the translation sentence and provides the translation to drive the method for providing a translation according to the exemplary embodiment of the present invention.

Figure 3:
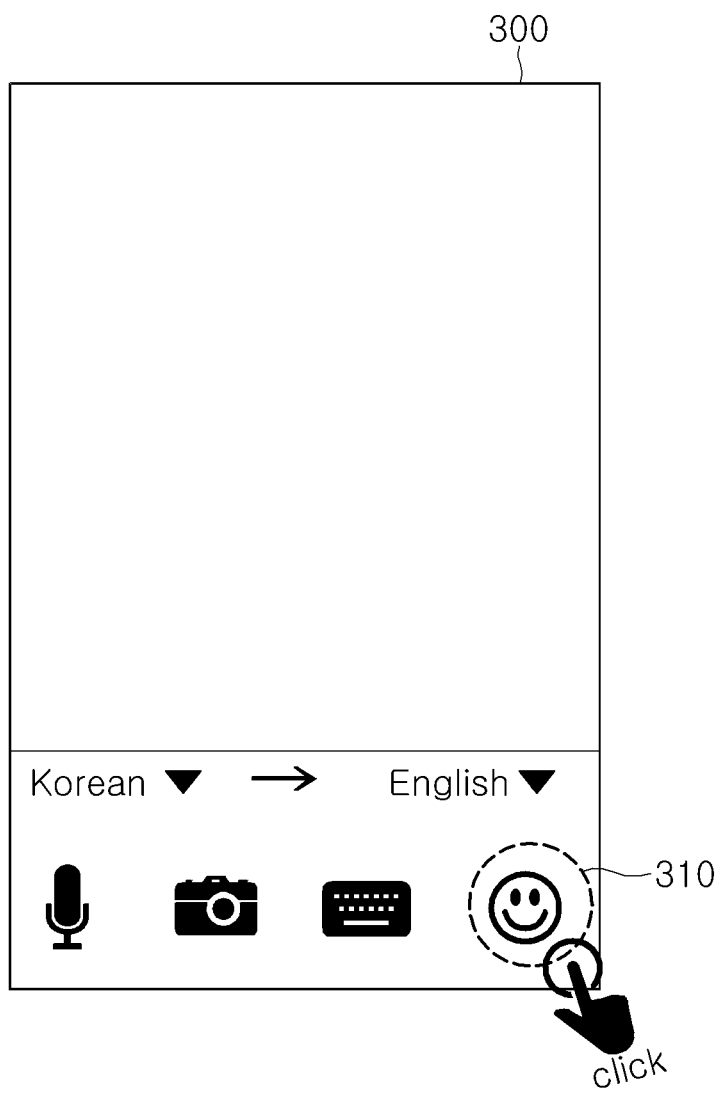
FIG. 3 is an exemplary diagram disclosing a method for providing a translation by selecting an icon in a user terminal according to an exemplary embodiment of the present invention.

As a detailed exemplary embodiment therefor, in FIG. 3, a screen 300 of the user terminal 110 for a case in which the user clicks an icon 310 in the application (App) that translates the original sentence input by the user into the translation sentence and provides the translation to drive the method for providing a translation according to the exemplary embodiment of the present invention is illustrated.

Figure 4:
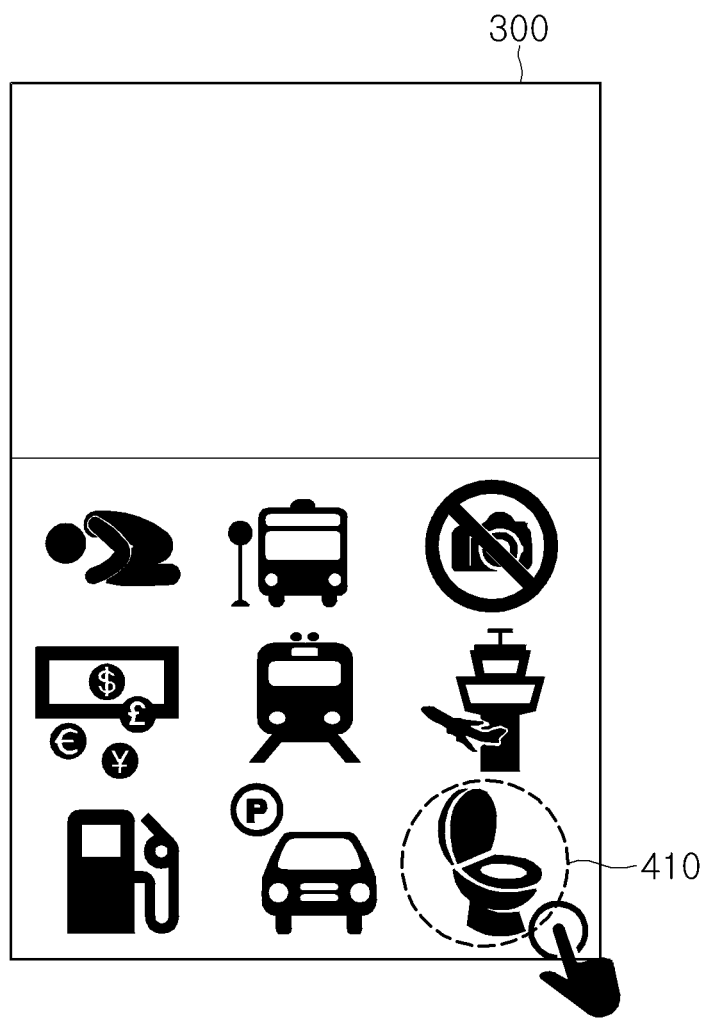
FIG. 4 is an exemplary diagram of a case of selecting an image among a plurality of images according to an exemplary embodiment of the present invention.

As a result, as illustrated in FIG. 4, a plurality of images may be presented on the screen 300 of the user terminal 110.

The plurality of images may be deployed by a predetermined method or a specific image may be recommended to the user.

For example, information on a region where the user is positioned is reflected to differentiate an arrangement order of the images or recommend a specific image. As a detailed example, when the user is located at an airport, images associated with the airport are deployed in a higher order to allow the user to first view the images or divide the images associated with the airport into separate items and recommend the divided items to the user.

As another example, deployment of some or all of the plurality of images may be adjusted and provided or recommended by considering the image selection history of the user in the past. That is, a probability that the user will select the image which had been selected before may be high, and furthermore, a probability that the user will select an image which had been selected in recent years may be higher. As described above, the image selection history of the user is reflected to differentiate the arrangement order of the images or recommend the specific image.

In order to help the user select the image, when the user positions a pointer indicating a specific region on a specific image on the screen 300 of the user terminal 110, a part or the entirety of an original sentence or a translation sentence corresponding to the specific image may be presented on the screen 300 in the user terminal 110.

Subsequently, in step S120, the user terminal 110 verifies the image selected by the user among the plurality of images.

For example, as illustrated in FIG. 4, an image 410 may be selected by a method in which the user clicks on one image among the plurality of images on the screen 300 of the user terminal 110 such as the smart phone, or the like, and as a result, the user terminal 110 recognizes identification information of the image selected by the user to verify the selected image.

Next, in step S130, the user terminal 110 obtains an original sentence corresponding to the image selected by the user and a translation sentence for the image from a database 140 (or 150)

As an exemplary embodiment thereof, the user terminal 110 transmits information on the selected image to the server 120 that may search the database 150 and allows the server 120 to derive the original sentence and the translation sentence corresponding to the selected image by using the database 150. The user terminal 110 receives the original sentence and the translation sentence from the server 120 to obtain the original sentence and the translation sentence corresponding to the selected image.

In this case, the user terminal 110 need not directly drive the database 140 and may receive and use only a search result without the need of directly performing a search work on the database 140, and as a result, consumption of a computing resource in the user terminal 110 may be reduced.

Alternatively, the user terminal 110 may directly search the database 140 to derive the original and the translation corresponding to the selected image. In particular, the user of the user terminal 110 may download and use the entirety of the database or some data to the user terminal 110 against a situation in which it is difficult to connect the user terminal 110 to the network 130 (for example, when the user deviates from a communication service area due to a foreign business trip or the connection to the network is limited due to other reasons).

Lastly, in step S140, the user terminal 110 provides the original sentence corresponding to the selected image and the translation for the original sentence to the user together with the selected image.

Herein, providing the original sentence and the translation for the original sentence together with the image means providing the original sentence, the translation sentence, and the image so as to be simultaneously viewed by the user on one screen in the display device of the user terminal 110.

Figure 5:
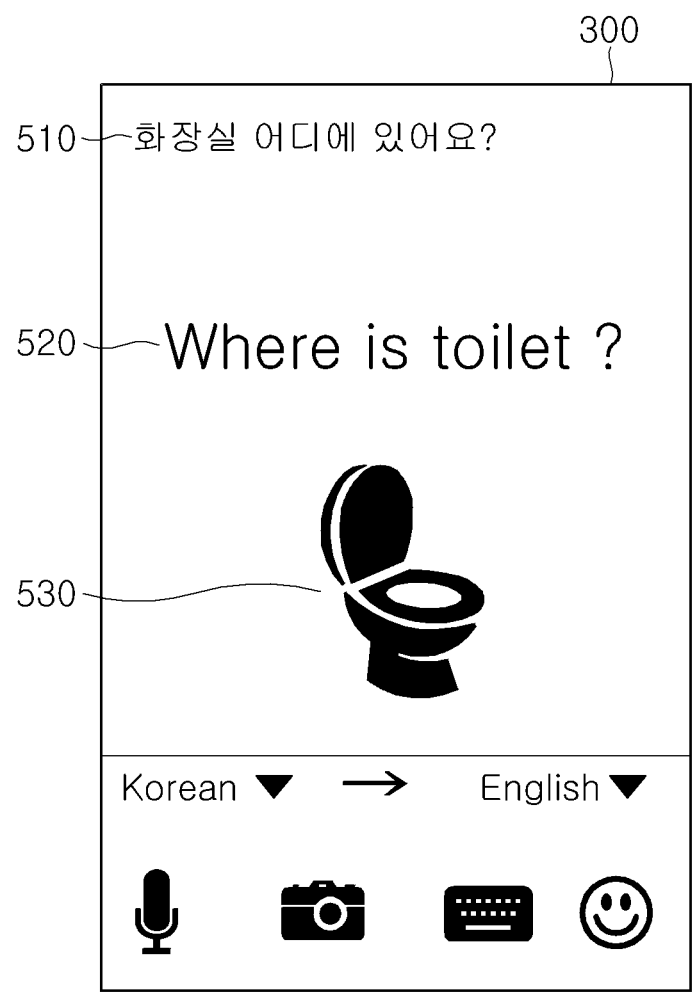
FIG. 5 is an exemplary diagram of a screen presenting a sentence in an original language and a translation of the sentence for the selected image according to an exemplary embodiment of the present invention.

For example, FIG. 5 illustrates a case of providing an original sentence 510 corresponding to the selected image 530 and a translation 520 for the original sentence 510 on the screen 300 of the user terminal 110 such as the smart phone, and the like together with the selected image.

As illustrated in FIG. 5, the original sentence 510 corresponding to the selected image 530 and the translation 520 for the original sentence 510 are provided together with the selected image 530, and as a result, a user who intends to translate the original sentence and a counterpart of the user who receives the translated sentence may more efficiently recognize the original sentence and the translation sentence and have a higher degree of understanding.

In one embodiment, the user may modify the original sentence corresponding to the selected image to calculate the translation for the original sentence.

When the user requests a translation by modifying the original sentence corresponding to the selected image, the translation may be derived by applying a translation algorithm implemented through machine learning with respect to the modified original sentence in the user terminal 110. The modified translation may be derived by using the original sentence and the translation of the original sentence stored in the database. For example, a modified part of the original sentence is calculated and thereafter, the modified part of the original sentence is reflected to the translation corresponding to the original sentence to derive the modified translation. As a more detailed example, a case is described in which the original sentence stored in the database is "버스 터미널이 어디입니까" and the translation sentence for the original is "Where is the bus terminal?" In this case, when the user modifies the original sentence to "고속 버스 터미널이 어디입니까?" to request the translation for the modified sentence, "bus" is modified to "express bus" in the translation to calculate a final translation as "Where is the express bus terminal?" by considering that "버스" is modified to "고속 버스" in the original sentence.

When the user modifies the original sentence and the translation sentence corresponding to the selected image to an appropriate expression, in the case where the user selects the same image afterwards by storing the modified original sentence and the translation sentence in the user terminal 110, the modified original sentence and the corresponding translation sentence may be provided.

FIG. 6 illustrates a configuration of a database 140 (or 150) according to an exemplary embodiment of the present invention. As illustrated in FIG. 6, the database 140 (or 150) may be configured to include matching information of the plurality of images and the original sentences and the translation sentences corresponding thereto.

In more detail, the database 140 (or 150) may be configured to include matching information for sentences of a plurality of languages including, with respect to one image 610, a sentence ("미안합니다") 620 of a first language, a sentence ("I am sorry") 630 of a second language, a sentence ("ごめんなさい") 640 of a third language, and a sentence ("对不起") 650 of a fourth language corresponding to the one image 610. As a result, the original sentence (for example, the sentence of the first language in the case of Korean) for the image selected by the user and the translation sentence (one or two or more among the sentences of the second to fourth languages) corresponding to the original may be provided.

In this case, the sentences of the second to fourth languages may become the original sentence and the sentence of the residual language may be used as the translation sentence. Furthermore, translations of a plurality of languages may be together provided with respect to one original sentence.

The database 140 (or 150) may be driven in connection with the server 120 or downloaded and driven in the user terminal 110.

As a result, when the user selects one of the plurality of images presented in the user terminal 110, the user terminal 110 may provide the original sentence corresponding to the selected image and the translation sentence for the original sentence, which are calculated by searching the database 140 (or 150) together with the selected image.

The database 140 (or 150) may further include information on a category of the image and furthermore, may include subject words for the image.

Figure 7:
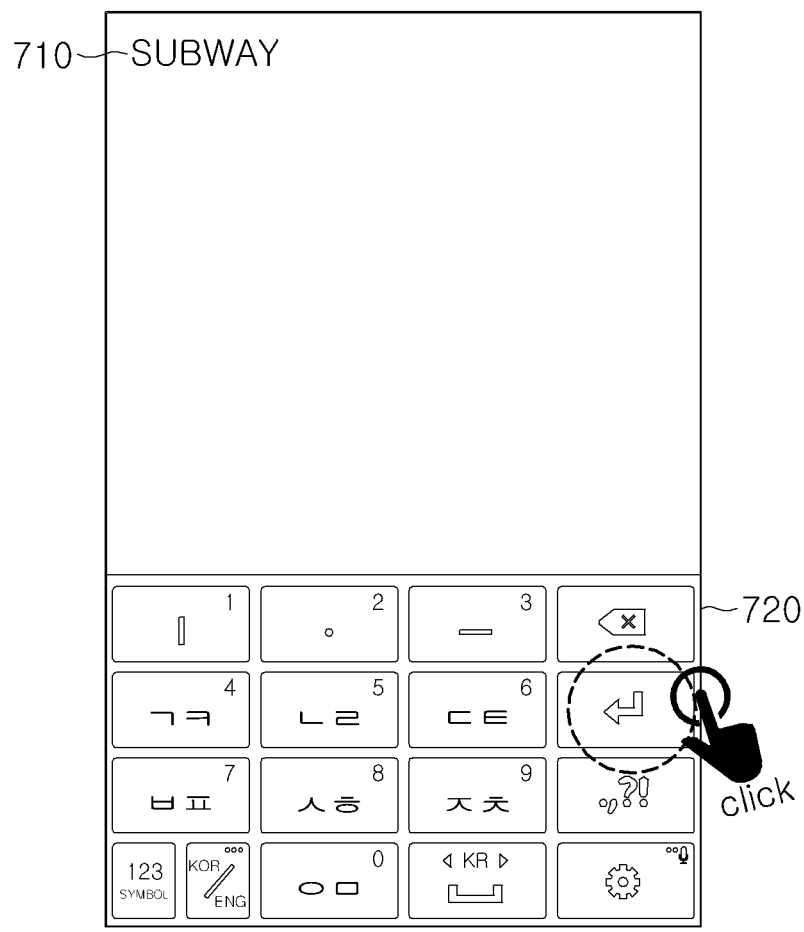
FIG. 7 is an exemplary diagram of a keyword input screen according to an exemplary embodiment of the present invention.

FIG. 7 illustrates an exemplary diagram of a keyword input screen 720 according to an exemplary embodiment of the present invention. According to the exemplary embodiment of the present invention, a plurality of images are presented to the user and in this case, since the plurality of images may increase to a considerable number, it is preferable to allow the user to effectively search and select the plurality of images.

As an exemplary embodiment therefor, the user may input a keyword and an image associated with the input keyword is searched to be presented to the user, and as a result, the user may more conveniently select an image which the user intends to select among the plurality of images.

As a more detailed example, FIG. 7 illustrates a case in which the user inputs a keyword 710 "SUBWAY".

As a result, in the case of the input keyword, when there is an original sentence or a translation sentence including the input keyword in the database, an image corresponding to the original or translation sentence is derived to be presented to the user.

Alternatively, the image corresponding to the input keyword is derived to be presented to the user by comparing the input keyword with the subject word for the image in the database.

Figure 8:
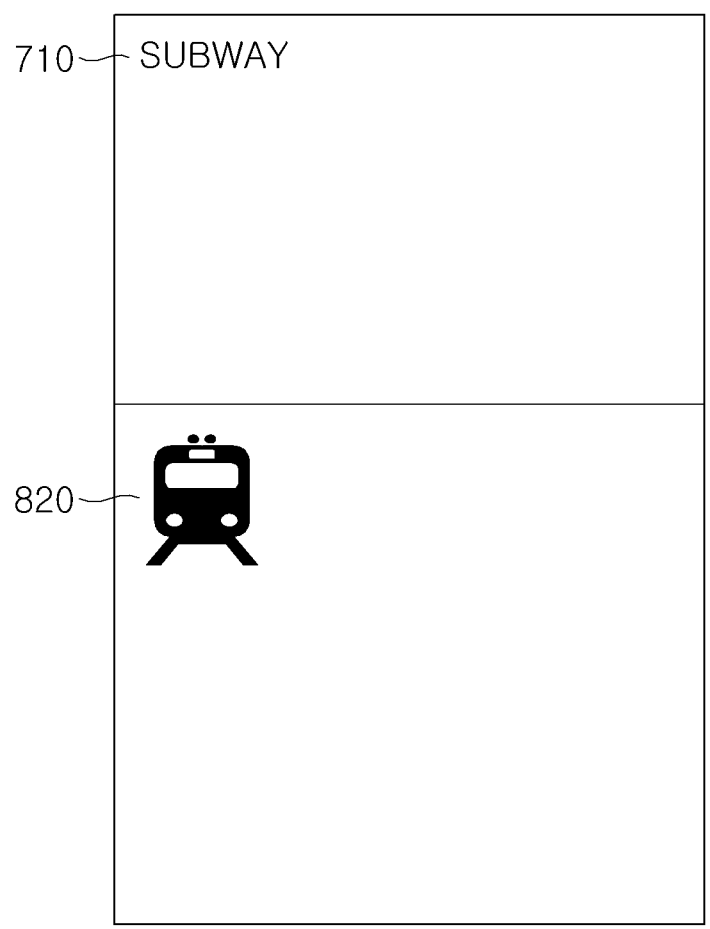
FIG. 8 is an exemplary diagram of an image presenting screen corresponding to an input keyword according to an exemplary embodiment of the present invention.

As a result, as illustrated in FIG. 8, the user may receive suggestion of one or more images 820 corresponding to the keyword 710 input by the user.

Figure 9:
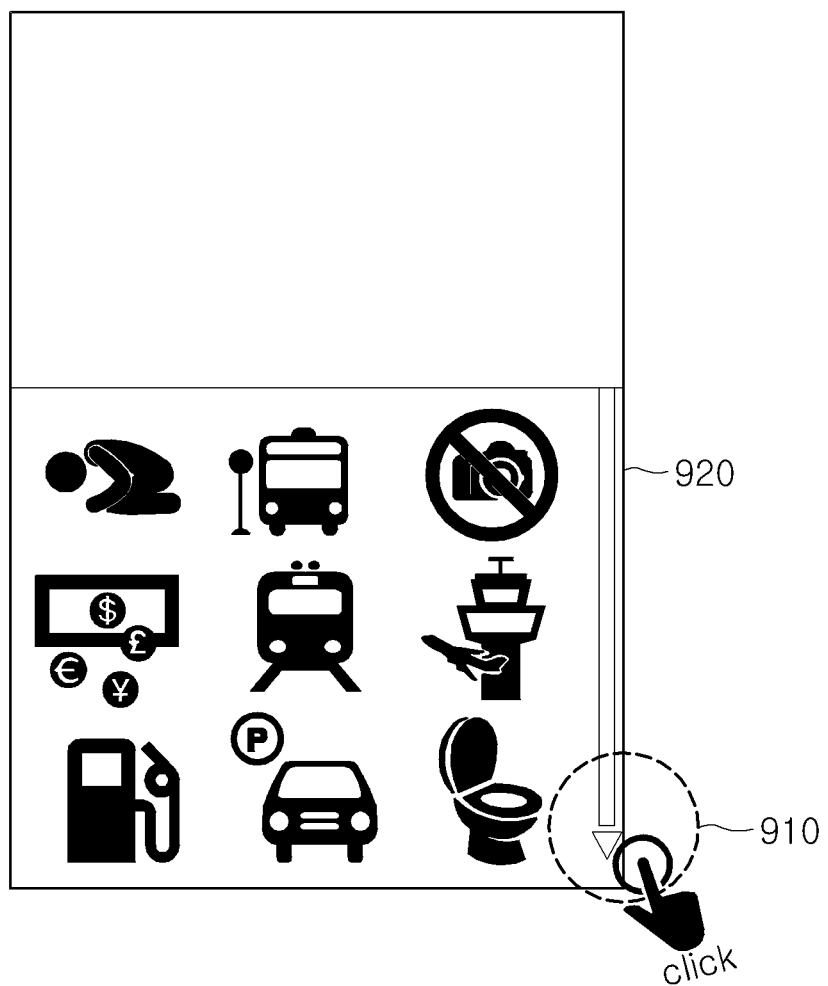
FIG. 9 is an exemplary diagram of an image scroll screen according to an exemplary embodiment of the present invention.

FIG. 9 illustrates a screen 920 in which an image desired by a user is searched by scrolling the screen according to an exemplary embodiment of the present invention. As described above, the user terminal 110 presents a plurality of images to the user and in this case, since the plurality of images may increase to the considerable number, components such as a scroll, and the like may be included in order to display the plurality of images on a limited screen. As a result, the user may search and select the image desired thereby while scrolling the screen 920 of the user terminal 110 by clicking on the scroll bar 910.

Figure 10:
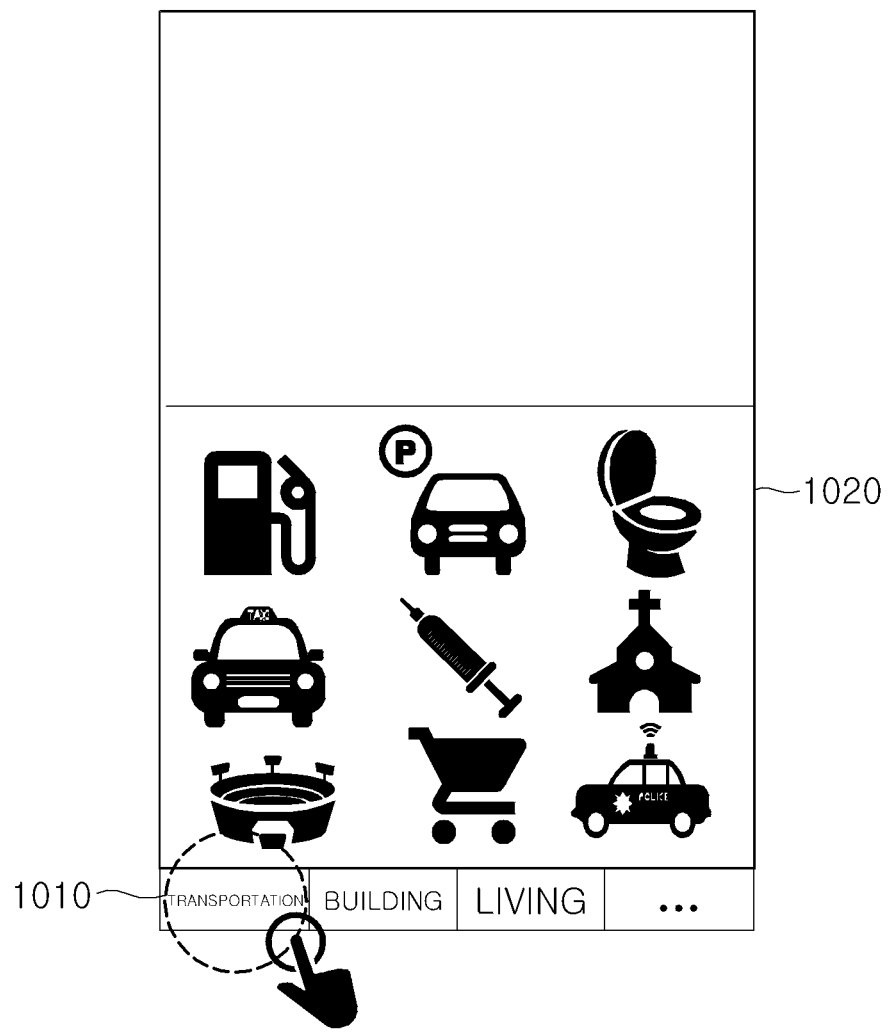
FIG. 10 is an exemplary diagram of an image search screen using a category according to an exemplary embodiment of the present invention.

FIG. 10 illustrates an image search screen 1020 using a category according to an exemplary embodiment of the present invention.

The user may search and select the plurality of images by using the scroll as illustrated in FIG. 9, but even in this case, if the number of the images considerably increases, it may be considerably difficult for the user to search and select an appropriate image.

Therefore, a category classified with respect to a plurality of images may be presented and the user may search and select the appropriate image among limited number of images by selecting the category, and as a result, the user may more efficiently select the image.

Figure 11:
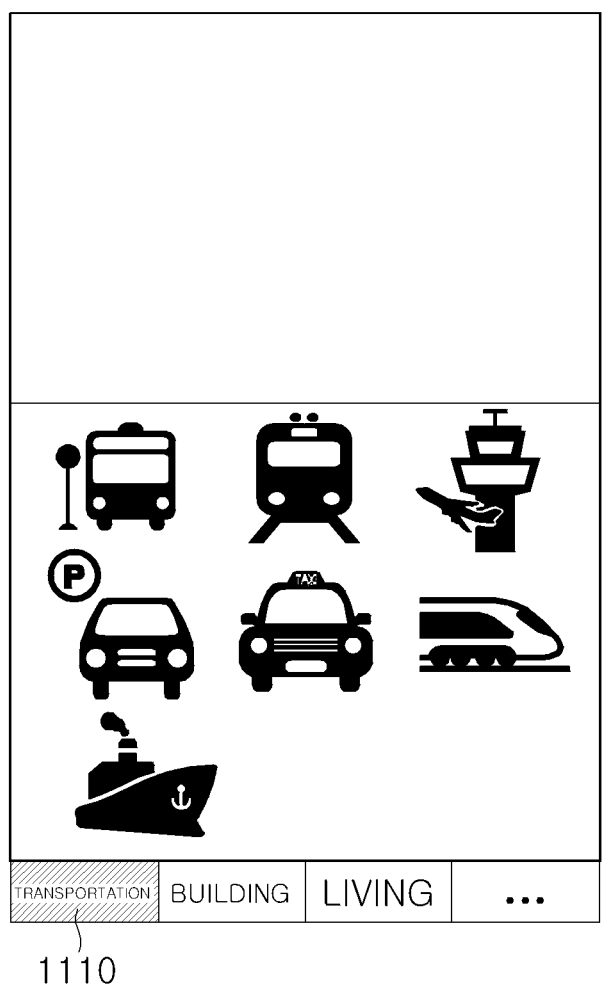
FIG. 11 is an exemplary diagram of an image presenting screen when a category is selected according to an exemplary embodiment of the present invention.

As a result, as illustrated in FIG. 10, when the user selects a specific category 1010 ("transportation"), images that belong to the specific category ("transportation") are presented as illustrated in FIG. 11, and as a result, the user may more conveniently search and select the desired image. In this case, the selected category 1010 may be displayed to be distinguished from categories which are not selected.

Figure 12:
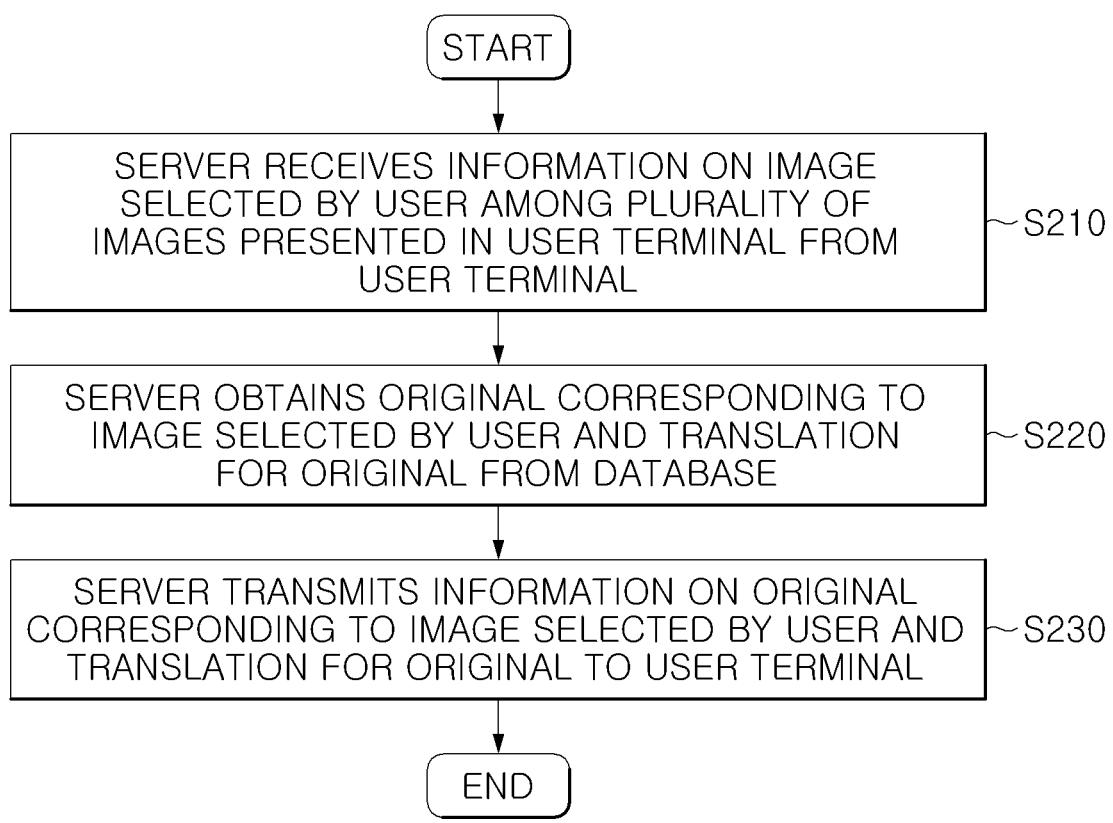
FIG. 12 is a flowchart of a method for providing a translation by a server according to an exemplary embodiment of the present invention.

FIG. 12 illustrates a flowchart of a method for providing a translation by the server 120 according to an exemplary embodiment of the present invention. Hereinafter, respective steps of the method for providing a translation according to the exemplary embodiment of the present invention will be reviewed in detail with reference to FIG. 12.

First, step S210 is described. In this step, the server 120 receives information on the image selected by the user among the plurality of images presented in the user terminal 110 from the user terminal 110.

That is, in the user terminal 110, the plurality of images are presented to the user as illustrated in FIG. 4 above and in this regard, the user selects one of the plurality of images, and as a result, in the user terminal 110, the selected image may be verified by recognizing identification information of the image selected by the user.

In this case, in the user terminal 110, deployment of some or all of the plurality of images may be adjusted and provided or recommended based on the information about the user.

As a more detailed example, the user terminal 110 may adjust and provide or recommend the deployment of some or all of the plurality of images by using positional information of the user or adjust and provide or recommend the deployment of some or all of the plurality of images by reflecting a past image selection history of the user.

The user terminal 110 may adjust and provide or recommend the deployment of some or all of the plurality of images by reflecting a history of an image which the user selected in the past.

In order to help the user select the image, when the user positions a pointer indicating a specific region on a specific image on the screen of the user terminal 110, a part or the entirety of an original or a translation corresponding to the specific image may be presented on the screen in the user terminal 110.

Subsequently, the user terminal 110 transmits to the server 120 the information on the image selected by the user among the plurality of images. For example, as illustrated in FIG. 4, the image may be selected by a method in which the user clicks on one image among the plurality of images in the user terminal 110 such as the smart phone, or the like, and as a result, the user terminal 110 recognizes the identification information of the image selected by the user to verify the selected image, and the information on the selected image is transmitted to the server 120 through the network 130.

Next, in step S220, the server 120 obtains the original sentence corresponding to the image selected by the user and the translation for the original sentence from the database 150.

As an exemplary embodiment thereof, the server 120 may receive the information on the selected image from the user terminal 110 and thereafter, obtain the original sentence and the translation sentence corresponding to the selected image by using the database 150.

In this case, the user terminal 110 needs not directly drive the database ### and may receive and use only a search result without the need to directly perform search work for the database 150, and as a result, consumption of a computing resource in the user terminal 110 may be reduced.

Lastly, in step S230, the server 120 transmits information on the original sentence corresponding to the selected image and the translation for the original sentence to the user terminal 110. As a result, the user terminal 110 may provide to the user the original sentence corresponding to the selected image and the translation for the original sentence together with the selected image.

For example, FIG. 5 illustrates a case in which the user terminal 110 such as a smart phone receives the information on the original sentence 510 corresponding to the selected image 530 and the translation 520 for the original sentence from the server 120 and thereafter, provides the original sentence 510 corresponding to the selected image 530 and the translation for the original sentence 510 to the screen of the user terminal 110 together with the selected image.

As illustrated in FIG. 5, the original sentence 510 corresponding to the selected image 530 and the translation 520 for the original sentence are provided together with the selected image 530, and as a result, a user who intends to translate the original sentence and a counterpart who receives suggestion of a translated sentence may more efficiently recognize the original sentence and the translation sentence, and have a higher degree of understanding.

When the user requests translation by modifying the original sentence corresponding to the selected image, the translation may be derived by applying a translation algorithm implemented through machine learning, with respect to the modified original sentence in the server 120 and furthermore, the modified translation may be derived by using the original sentence and the translation of the original sentence stored in the database 150. For example, the modified part of the original sentence is calculated and thereafter, the modified part of the original sentence is applied to the translation sentence corresponding to the original sentence to derive the modified translation.

When the user modifies the original sentence and the translation sentence corresponding to the selected image to an appropriate expression, in the case where the user selects the same image afterwards by storing the modified original and translation sentences in the database 150, the modified original and translation may be provided.

It is characterized in that a computer program according to yet another aspect of the present invention is a program for executing the respective steps of the method for providing a translation in a computer. The computer program may be a high-level language code executable by a computer by using an interpreter, and the like, as well as a computer program including a machine language code created by a compiler. In this case, the computer is not limited to a personal computer (PC) or a notebook computer and includes all information processing devices which include a central processing unit (CPU) such as the server, the smart phone, the tablet PC, the PDA, the cellular phone, and the like to execute the computer program.

FIG. 13 illustrates a configuration diagram of the user terminal 110 for providing a translation according to an exemplary embodiment of the present invention.

As illustrated in FIG. 13, the user terminal 110 for providing a translation according to the exemplary embodiment of the present invention may be configured to include an image presenting unit 111, a selected image verifying unit 112, an image corresponding information obtaining unit 113, and an image corresponding information providing unit 114.

Hereinbelow, the user terminal 110 for providing a translation according to the exemplary embodiment of the present invention will be described for each component. More detailed contents of the user terminal 110 for providing the translation according to the exemplary embodiment of the present invention may be inferred from the description of the method for providing the translation according to the exemplary embodiment of the present invention, and as a result, more detailed description of the user terminal 110 will be omitted below.

First, the image presenting unit 111 presents a plurality of images to a user.

Subsequently, the selected image verifying unit 112 verifies an image selected by the user among the plurality of images.

Next, the image corresponding information acquiring unit 113 obtains an original sentence corresponding to the selected image and a translation for the original sentence from the database 140. In this case, the database 140 may be directly connected to the user terminal 110 as illustrated in FIG. 13.

Lastly, the image corresponding information providing unit 114 provides the original sentence corresponding to the selected image and the translation for the original sentence to the user together with the selected image.

The above described image presenting unit 111, selected image verifying unit 112, image corresponding information obtaining unit 113, and/or image corresponding information providing unit 114 can be implemented as a software executable on a computer.

Furthermore, the image presenting unit 111, selected image verifying unit 112, image corresponding information obtaining unit 113, and/or image corresponding information providing unit 114 can be also implemented as a hardware (e.g. server, electronic equipment, etc.) The image presenting unit 111, selected image verifying unit 112, image corresponding information obtaining unit 113, and/or image corresponding information providing unit 114 may be configured as at least one microprocessor which may be controlled by at least one program stored in memory (not shown).

FIG. 14 illustrates a configuration diagram of the server 120 for providing a translation according to an exemplary embodiment of the present invention.

As illustrated in FIG. 14, the server 120 for providing a translation according to the exemplary embodiment of the present invention may be configured to include a selected information receiving unit 121, an image corresponding information obtaining unit 122, and an image corresponding information transmitting unit 123.

Hereinbelow, the server 120 for providing a translation according to the exemplary embodiment of the present invention will be described for each component. More detailed contents of the server 120 for providing the translation according to the exemplary embodiment of the present invention may be inferred from the description of the method for providing the translation according to the exemplary embodiment of the present invention, and as a result, a more detailed description of the server 110 will be omitted below.

First, the selected information receiving unit 121 receives information on the image selected by the user among the plurality of images presented in the user terminal 110 from the user terminal 110.

Subsequently, the image corresponding information obtaining unit 122 obtains an original sentence corresponding to the selected image and a translation for the original sentence from a database. In this case, the image corresponding information obtaining unit 122 may obtain the original sentence corresponding to the selected image and the translation for the original sentence by using the database 150 provided in the server 120 as illustrated in FIG. 14.

Lastly, the image corresponding information transmitting unit 123 transmits information on the original sentence corresponding to the selected image and the translation for the original sentence to the user terminal 110. As a result, the user terminal 110 may provide the original sentence corresponding to the selected image and the translation for the original sentence together with the selected image.

The above described selected information receiving unit 121, image corresponding information obtaining unit 122 and/or image corresponding information transmitting unit 123 can be implemented as a software executable on a computer.

Furthermore, the selected information receiving unit 121, image corresponding information obtaining unit 122 and/or image corresponding information transmitting unit 123 can be also implemented as a hardware (e.g. server, electronic equipment, etc.) The selected information receiving unit 121, image corresponding information obtaining unit 122 and/or image corresponding information transmitting unit 123 may be configured as at least one microprocessor which may be controlled by at least one program stored in memory (not shown).

The above description illustrates the technical spirit of the present invention and various modifications and transformations can be made to those skilled in the art without departing from an essential characteristic of the present invention. Therefore, the exemplary embodiments disclosed in the present invention do not limit the technical spirit of the present invention but describe the technical spirit and the present invention is not limited to the exemplary embodiments. The scope of the present invention should be interpreted by the appended claims and it should be analyzed that all technical spirit in the equivalent range is intended to be embraced by the present invention.

What is claimed is:

1. A method for generating and displaying an original sentence and a translation of the original sentence on a screen of a user terminal, the method comprising:
    displaying, by the user terminal, a plurality of categories classifying a plurality of images on the screen of the user terminal;
    displaying, by the user terminal, a plurality of images belonging to a category selected from the plurality of categories by the user through a user input device provided on the user terminal;
    verifying, by the user terminal, a single image among the plurality of images selected by the user through the user input device provided on the user terminal;
    obtaining, by the user terminal, a predefined original sentence corresponding to the single image selected by the user and a predefined translation of the predefined original sentence from a database; and
    displaying, by the user terminal, the predefined original sentence corresponding only to the selected single image and the predefined translation of the predefined original sentence together with the selected single image on the screen of the user terminal, so that the predefined original sentence, the predefined translation and the selected single image are visible to the user simultaneously on the screen of the user terminal.

2. The method of claim 1, wherein in the displaying of the plurality of images, the user terminal adjusts and provides or recommends deployment of some or all of the plurality of images based on the information about the user.

3. The method of claim 2, wherein in the displaying of the plurality of images, the user terminal adjusts and provides or recommends deployment of some or all of the plurality of images by using positional information of the user.

4. The method of claim 2, wherein in the displaying of the plurality of images, the user terminal adjusts and provides or recommends deployment of some or all of the plurality of images based on the past image selection history of the user.

5. The method of claim 1, wherein in the displaying of the plurality of images, when the user positions a pointer indicating a specific region on a specific image on a screen of the user terminal, the user terminal presents a predefined original sentence and a translation sentence corresponding to the specific image on the screen.

6. The method of claim 1, wherein in the obtaining of the predefined original sentence and the predefined translation for the original sentence, the user terminal transmits information on the single image selected by the user to a server and thereafter, receives from the server the predefined original sentence corresponding to the selected image and the predefined translation for the predefined original sentence, which are obtained by searching the database.

7. The method of claim 1, wherein the user terminal keeps a history of the user modifying the predefined original sentence or the predefined translation of the predefined original sentence in the past, and modifies and provides the predefined original sentence corresponding to the selected image or the predefined translation for the original sentence based on the history of the user modifying the predefined original sentence or the predefined translation of the predefined original sentence in the past.

8. The method of claim 1, wherein the displaying of the plurality of images includes:
    receiving, by the user terminal, a keyword input by the user; and searching and presenting, by the user terminal, the plurality of images associated with the keyword.

9. The method of claim 1, further comprising:
downloading and storing, by the user terminal, at least some data in the database from a server.

10. A method for providing a translation, in which a server provides an original sentence and a translation of the original sentence to be displayed on a screen of a user terminal, the method comprising:
receiving, by the server, information on a single image selected by a user from among a plurality of images belonging to a category selected by the user from a plurality of categories classifying the plurality of images presented in the user terminal from the user terminal;
obtaining, by the server, a predefined original sentence corresponding to the single image selected by the user and a predefined translation of the predefined original sentence from a database; and
transmitting, by the server, information on the predefined original sentence corresponding only to the single image selected by the user, the predefined translation of the predefined original sentence and the selected single image to the user terminal, so that the predefined original sentence, the predefined translation and the selected single image are visible to the user simultaneously on the screen of the user terminal.

11. A non-transitory computer readable recording medium storing a program for generating and displaying an original sentence and a translation of the original sentence on a screen of a user terminal, said program when executed by a computer performing the steps comprising:
displaying, by a user terminal, a plurality of categories classifying a plurality of images on the screen of the user terminal;
displaying, by the user terminal, a plurality of images belonging to a category selected from the plurality of categories by the user through a user input device provided on the user terminal;
verifying, by the user terminal, a single image among the plurality of images selected by the user through the user input device provided on the user terminal;
obtaining, by the user terminal, a predefined original sentence corresponding to the single image selected by the user and a predefined translation of the predefined original sentence from a database; and
displaying, by the user terminal, the predefined original sentence corresponding only to the selected single image and the predefined translation of the predefined original sentence together with the selected single image on the screen of the user terminal, so that the predefined original sentence, the predefined translation and the selected single image are visible to the user simultaneously on the screen of the user terminal.

* * * * *